Figure 3:
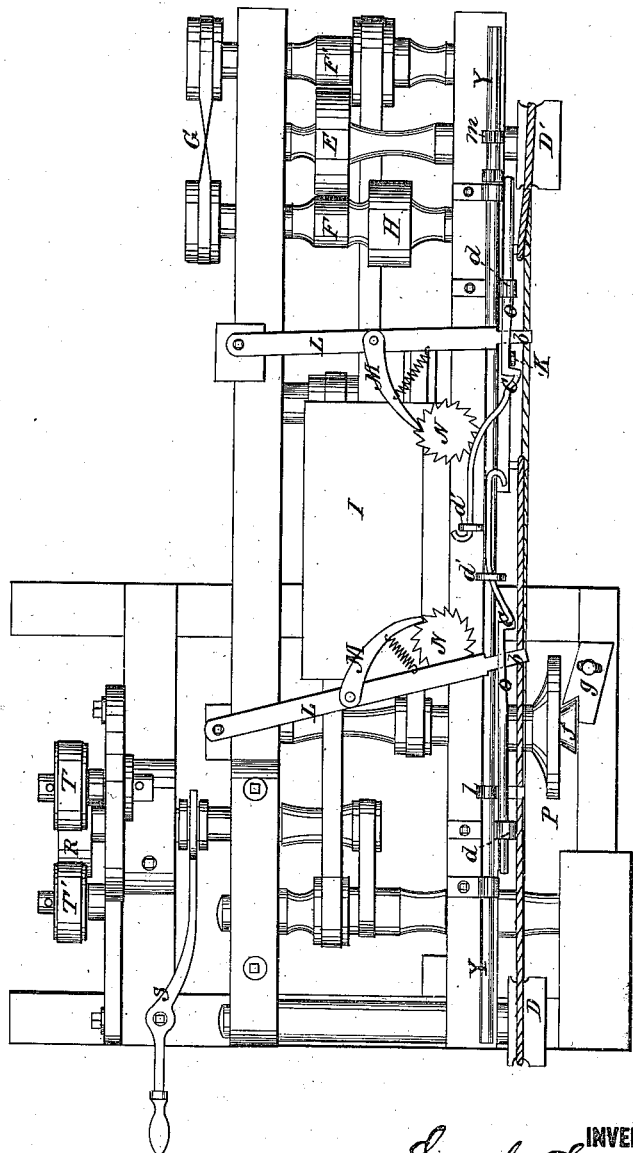

G. C. SKIDMORE.
MACHINES FOR CUTTING AND COILING HOOPS.
No. 173,354. Patented Feb. 8, 1876.
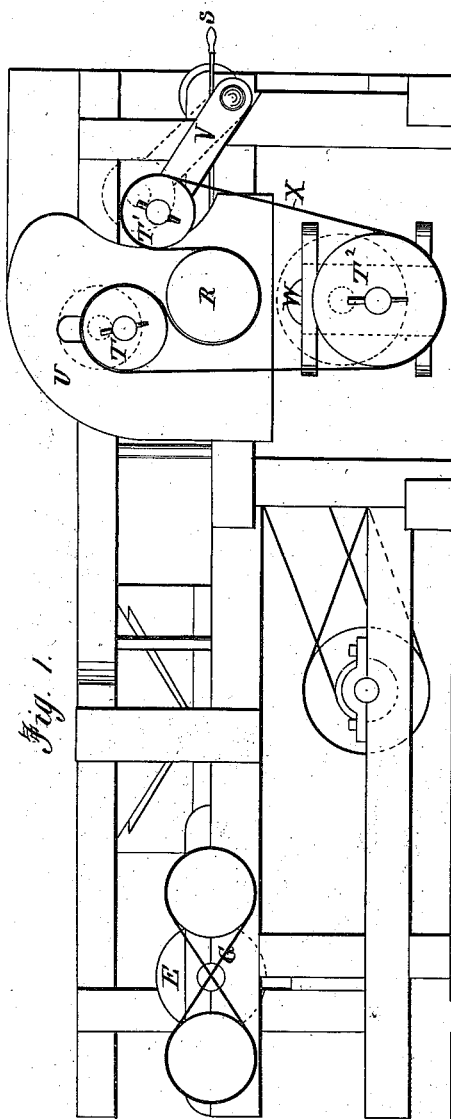
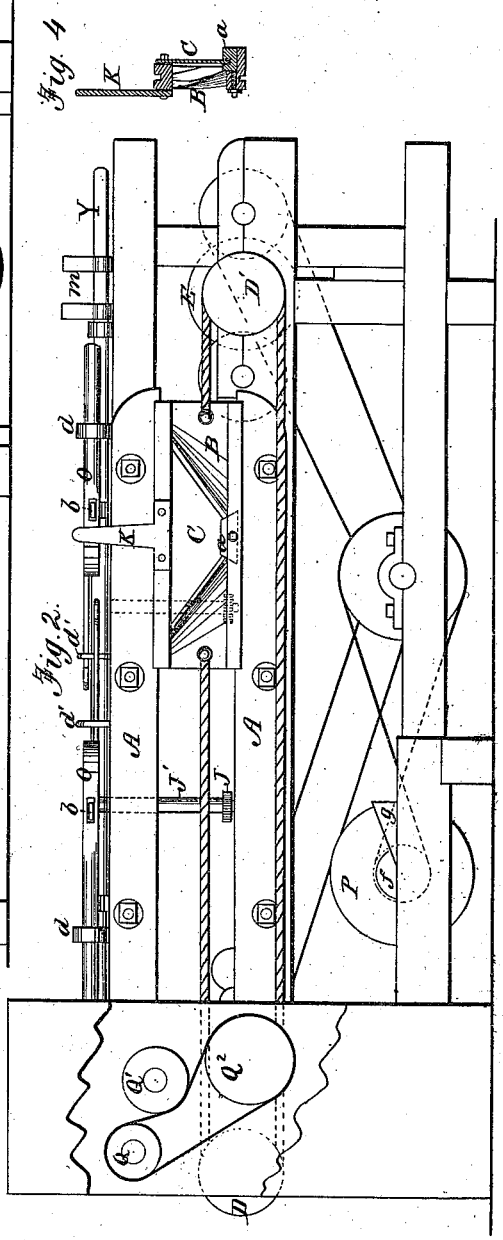
WITNESSES:
W. W. Hollingsworth
Solon C. Kemon
INVENTOR:
Geo. C. Skidmore
BY
ATTORNEYS.

G. C. SKIDMORE.
MACHINES FOR CUTTING AND COILING HOOPS.

No. 173,354.

2 Sheets—Sheet 2.

Patented Feb. 8, 1876.

WITNESSES:
W. W. Hollingsworth

INVENTOR:
Geo. C. Skidmore
BY
ATTORNEYS.

UNITED STATES PATENT OFFICE.

GEORGE C. SKIDMORE, OF GRAND RAPIDS, MICHIGAN, ASSIGNOR TO ABEL F. SKIDMORE, OF SAME PLACE.

IMPROVEMENT IN MACHINES FOR CUTTING AND COILING HOOPS.

Specification forming part of Letters Patent No. 173,354, dated February 8, 1876; application filed December 1, 1875.

*To all whom it may concern:*

Be it known that I, GEORGE C. SKIDMORE, of Grand Rapids, in the county of Kent and State of Michigan, have invented an Improvement in Machines for Cutting and Coiling Hoops; and I do hereby declare that the following is a full, clear, and exact description of the same, reference being had to the accompanying drawing forming a part of this specification, in which—

Figure 1 is a vertical rear elevation; Fig. 2, a vertical front elevation; Fig. 3, a plan; Fig. 4, a sectional detail of the knife and means for adjusting same.

This invention relates to certain improvements in barrel-hoop machines; and it consists in the arrangement of the devices for feeding the boards to the knife; in the adjustment of the knife; the means for automatically reversing the motion of the reciprocating shuttle carrying the knife, and in the means for trimming and coiling the hoops, as hereinafter more fully described.

In the drawing, A A represent parallel bars of the main frame of the machine, which form the race or guideways for the shuttle B, carrying the knife C. Said shuttle is attached to a chain revolving around pulleys D D', of which D' is attached to the same shaft with a friction-pulley, E, which shaft is made at one end laterally adjustable, so that the pulley E may be made to engage alternately with the friction-pulleys F F', located upon driving-shafts upon opposite sides of the pulley E. Said driving-shafts are geared together by means of pulleys and a cross-belt, G, so that when they are driven by a belt connected with pulley H the two shafts are made to revolve in opposite directions. Now, as the friction-pulley E is made to engage alternately with the pulleys upon the oppositely rotating shafts, the pulleys D D' and the chain passing around the same are made to rotate alternately in opposite directions, thus imparting to the shuttle a reciprocating motion. The boards from which the hoops are cut are fed laterally across the machine upon a hinged adjustable table, I, which may be either elevated or depressed to give the proper bevel to the hoop. The boards are pressed forward to the reciprocating knife by means of the feed-wheels J upon the ratchet-posts J', so that at each stroke of the shuttle the knife cuts off a strip or hoop which is delivered upon the opposite side of the machine and received by a workman. The knife C is made with two cutting-edges, so as to cut at each stroke. The upper part of the knife is securely attached to the shuttle by means of screws, and the lower side is let into an adjustable piece of metal, $a$, which may be adjusted laterally in the shuttle to regulate the thickness of the hoop to be cut. To render the feed of the boards automatic an arm, K, is attached to the shuttle, which actuates symmetrically arranged devices on each side of the board to operate the feed-wheels J. A lever, L, is pivoted at one end and provided with a pawl, M, which engages with the ratchet wheel N, the said pawl being held to the ratchet by means of a spring. The moving or free ends of the lever L pass through sliding catches O and project beyond at $b$, so that they are in a position to be struck by the arm of the shuttle to retract the pawl upon the ratchet. As the arm then moves back it strikes the catch $c$ of the slide, and, by bringing forward the lever L and its pawl, turns the ratchet and its corresponding feed-wheel upon the ratchet-post below, thus advancing the boards. After the slide O has been sufficiently advanced the arm of the shuttle passes beyond the catch and operates similarly upon the feeding devices upon the other side. The slide O is arranged in guideways $d\ d'$, which are so arranged as to make the motion of the slide not parallel with the shuttle, but oblique thereto, thus permitting the arm of the shuttle to automatically move the catch $c$ out of the way as it advances the slide, and leave it in such a position that on the return stroke the said arm will first strike the projecting end $b$ of the lever L. P is the joint-trimmer, consisting of a disk with knives arranged upon its sides, and a central flange, $f$. A gage, $g$, is arranged upon the side, and is made adjustable thereto by a set-screw.

This device is operated through belts by means of driving-pulleys, and the object of the same is to taper the ends of the hoops, so as to form the joint, the flange serving to regulate the distance the ends are to be inserted while in the hands of the workman.

Q Q¹ Q² are three pulleys, which constitute the crimping device for bending the hoops into circular shape. A belt is passed around Q Q², and the hoops after being tapered are passed between the said belt and the independent pulley Q¹, which gives to the same a circular form.

The hoops are then coiled in bundles by the following devices: R is a pulley attached to a shaft rotated by a belt, and made adjustable in its bearings through a forked lever, S. T T¹ T² are three pulleys, each adjustable in the plane of the pulley R, to or from the same. T is made adjustable in a slotted plate, U. T¹ is journaled upon an adjustable independent arm, V, and T² is adjustable upon a vertical slide, W. Around each of these three pulleys is arranged a belt, X, which also passes around the central pulley R, so as to encompass very nearly its entire periphery. Upon this pulley the hoops are coiled in layers, the tension of the band serving to hold them in proper position.

The tension of the band is regulated by the lower pulley, which is weighted, and as the hoops are coiled the pulleys T T¹ T² automatically adjust themselves to the increased diameter of the central pulley R. When the latter has been filled the coil is tacked together, and after the band has been loosened by a treadle mechanism the coil is shifted by the lever S, which, being thrown to one side, moves the pulley R and its shaft laterally through a hole in the plate U, the edges of which throw off the coil.

To render the reciprocation of the shuttle automatic, as well as the feed, a rod, Y, is disposed along the top of the frame and arranged to move in guideways, so as to slide freely. Said rod is provided with lugs $l\ l$, against which the arm of the shuttle strikes to move it. The extremity of the rod is provided with a fork, $m$, in which may be placed the end of a lever whose opposite end shall effect the shifting of the friction-pulley from one of its driving-pulleys to the other.

Having thus described my invention, what I claim as new is—

1. The combination, with an arm attached to the shuttle, and the feed-wheels attached to the ratchet-posts, of the lever L, pawl M, ratchet N, and sliding catch O, substantially as and for the purpose described.

2. The combination, with the shuttle, of the knife C, having one side contained in an adjustable piece, $a$, substantially as and for the purpose described.

3. The combination, with the joint-trimmer P and the gage $g$, of a flange, $f$, as and for the purpose described.

4. The combination of the laterally-adjustable pulley R, the plate U, the automatically-adjustable pulleys T T¹ T², and the belt X, substantially as and for the purpose described.

GEO. C. SKIDMORE.

Witnesses:
SOLON C. KEMON,
CHAS. A. PETTIT.